Sept. 11, 1962 R. R. LUHM 3,053,100
RIVETING MACHINE
Filed June 19, 1959 2 Sheets-Sheet 1
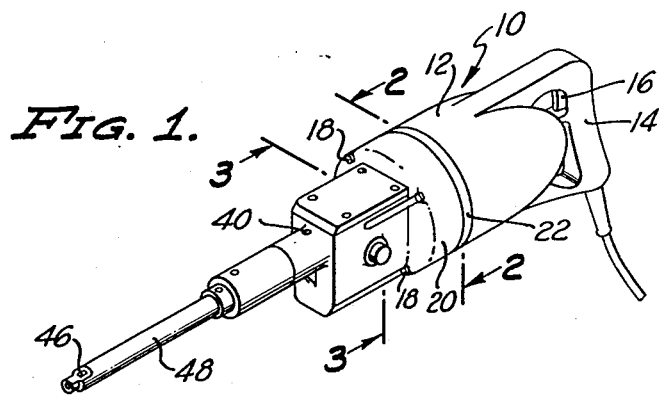
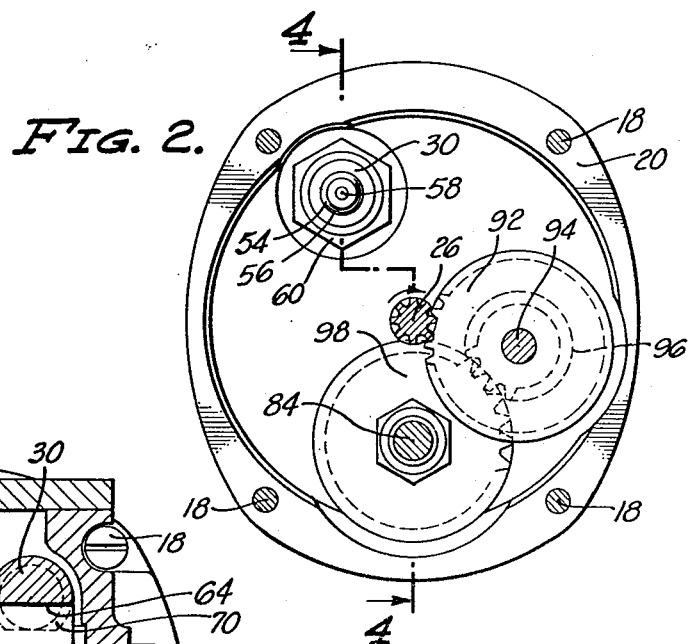
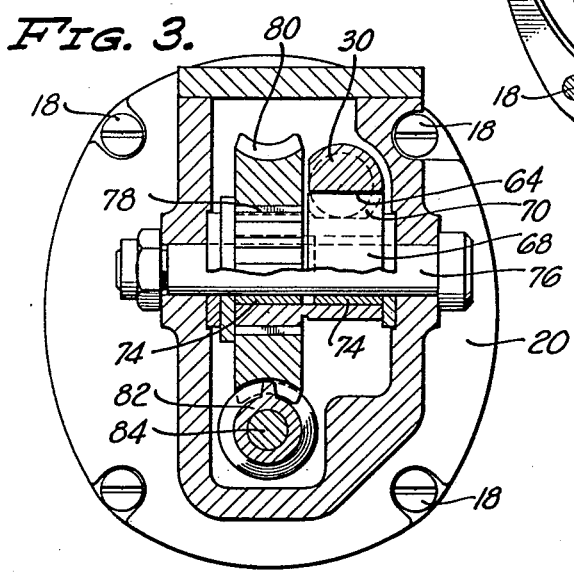
INVENTOR
RALPH R. LUHM
BY HIS ATTORNEYS
HARRIS, KIECH, RUSSELL & KERN Sept. 11, 1962 R. R. LUHM 3,053,100
RIVETING MACHINE
Filed June 19, 1959 2 Sheets-Sheet 2
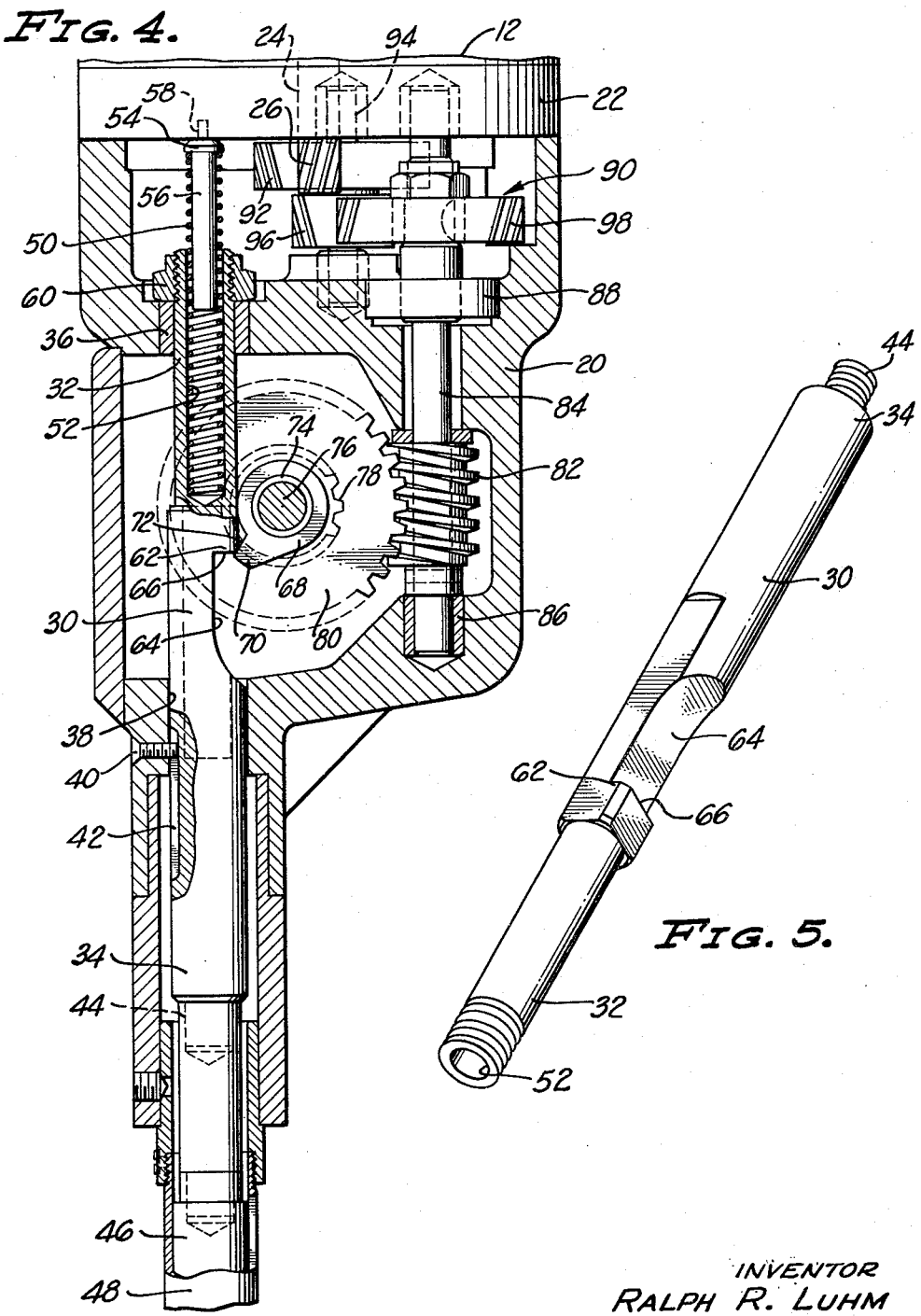
INVENTOR
RALPH R. LUHM
BY HIS ATTORNEYS
HARRIS, KIECH, RUSSELL & KERN

United States Patent Office 3,053,100
Patented Sept. 11, 1962

3,053,100
RIVETING MACHINE
Ralph R. Luhm, Anaheim, Calif., assignor to Olympic Screw & Rivet Corporation, Downey, Calif., a corporation of California
Filed June 19, 1959, Ser. No. 821,511
1 Claim. (Cl. 74—55)

The present invention relates in general to a riveting machine and, more particularly, to a riveting machine which is adapted to set a blind rivet assembly by displacing a pin of the rivet assembly axially relative to a sleeve thereof, and which is driven by a rotary motor, preferably an electric motor.

As more specific background, the invention is particularly applicable to, and will therefore be considered in connection with, a riveting machine adapted to set a blind rivet assembly of the type in which the pin of the rivet assembly is pulled axially relative to the sleeve. In such a blind rivet assembly, the sleeve is provided with a head at one end and a tail at the other. The pin extends through the sleeve and is provided thereon adjacent the tail end of the sleeve with means for flaring, or otherwise enlarging, the tail of the sleeve as the pin is pulled axially relative to the sleeve. The opposite end of the pin, i.e., the end thereof adjacent the head of the sleeve, is provided with means thereon engageable by a rivet chuck forming part of the riveting machine.

A primary object of the invention is to provide a riveting machine which includes rack and interrupted pinion means actuated by the rotary motor for moving the rivet chuck, or other rivet engaging means, axially in one direction and which includes spring means for moving the rivet chuck in the opposite direction. With this construction, the rack and interrupted pinion means moves the rivet chuck in a direction to pull the pin axially relative to the sleeve with the blind rivet assembly discussed above, and the spring means returns the chuck to its initial position after the pin has been pulled.

An important advantage of utilizing a rack and interrupted pinion means actuable by a rotary motor is that it provides a positive action during the working stroke and produces a working stroke for the rivet chuck of substantial length.

An important object of the invention is to provide a riveting machine wherein the rack and interrupted pinion means includes a rack and an interrupted pinion each having but a single tooth, the single tooth of the pinion engaging the single tooth of the rack once during each revolution of the pinion to produce the working stroke of the rack in opposition to the action of the spring means, which returns the rack to its original position after the single tooth of the pinion disengages the single tooth of the rack.

The use of single teeth on the rack and pinion represents an important feature since it results in simple parts which are capable of being manufactured extremely economically, it results in a considerable reduction in wearing surfaces, it results in a structure wherein the stroke is easily adjusted, and the like.

Another object of the invention is to provide a riveting machine wherein the rack and interrupted pinion means discussed above are mounted in a housing which is connected at one end to the case or housing of a rotary motor, preferably an electric motor, having a drive shaft which extends into the first housing mentioned.

Another object is to provide a driving connection between the drive shaft and the single tooth pinion which includes a worm wheel coaxial with and connected to the pinion, a worm meshed with the worm wheel, a worm shaft carrying the worm, and speed reducing gearing connecting the drive shaft to the worm shaft. With this construction, the single tooth pinion rotates at an extremely low speed relative to the speed of the motor so that impact forces upon engagement of the single tooth of the pinion with the single tooth of the rack are minimized. Also, since the single tooth pinion rotates at an extremely low speed, the torque applied thereto is quite high so that the pinion applies a large actuating force to the rack during the working stroke of the latter.

The foregoing objects, advantages, features and results of the present invention, together with various other objects, advantages, features and results thereof which will be evident to those skilled in the riveting machine art in the light of this disclosure, may be attained with the exemplary embodiment of the invention described in detail hereinafter and illustrated in the accompanying drawings, in which:

FIG. 1 is a perspective view on a reduced scale of a riveting machine which embodies the invention;

FIGS. 2 and 3 are transverse sectional views respectively taken in the planes of the arrowed lines 2—2 and 3—3 of FIG. 1;

FIG. 4 is a longitudinal sectional view taken along the arrowed line 4—4 of FIG. 2; and FIG. 5 is a perspective view of a rack forming part of a rack and interrupted pinion means of the invention.

Referring to the drawings, the numeral 10 designates an electric motor which includes a case or housing 12 provided at one end thereof with a handle 14, the latter carrying a trigger-type switch 16. Connected to the opposite end of the motor housing 12, as by screws 18, is the inner end of a housing 20, a bearing plate 22 being clamped between the motor housing 12 and the housing 20. The motor 10 includes a drive shaft 24 which projects from the motor housing 12 through the bearing plate 22 and which terminates in a drive gear 26 within the inner end of the housing 20.

Reciprocable along a rack axis which extends longitudinally of the housing 20 is a bolt or rack 30 having inner and outer ends 32 and 34, the rack 30 being slidable in a bearing 36 and a bearing bore 38 adjacent its inner and outer ends, respectively. Rotation of the rack 30 about its axis is prevented by a screw 40 carried by the housing 20 and extending into a longitudinal slot 42 in the rack.

The rack 30 is provided at its outer end 34 with means 44 for connecting a rivet chuck 46, or other rivet engaging means, to the rack, the connecting means 44 being shown as an externally threaded stud in the construction illustrated. The rivet chuck 46 is reciprocable in an elongated tubular housing 48 suitably connected to the open outer end of the housing 20. The rivet chuck 46 is of conventional construction so that any further description herein is not necessary.

The rack 30 is biased outwardly by a spring means 50 which is shown as comprising a compression coil spring seated at one end in an axial bore 52 in the inner end 32 of the rack and seated at its other end against a head 54 of a spring guide 56 which, in turn, is seated against the bearing plate 22. The spring guide 56 extends into the spring means 50 and is provided thereon with a projection 58 which extends into the bearing plate 22 to hold the spring guide in its proper position.

The spring means 50 constantly biases the rack 30 toward the outer end of the housing 20, and, as will become apparent, serves to effect the return stroke of the rack. Outward movement of the rack 30 under the influence of the spring means 50 is limited by a nut 60 threaded on the inner end 32 of the rack and engageable with the housing 20 or, more accurately, with one end of the rack bearing 36. As will be apparent, the position of the nut 60 axially of the rack 30 may be adjusted to vary the starting position of the rack, and thus the stroke thereof.

Considering the manner in which the working stroke of the rack 30 is effected to move the rivet chuck 46 inwardly in setting a blind rivet assembly of the character hereinbefore described, the rack is provided thereon with a single tooth 62. This tooth is formed by providing the rack 30 with a transverse notch 64 in one side thereof, the bearing face of the tooth being formed by a side wall 66 of the notch 64 which is perpendicular to the axis of the rack.

Adjacent the rack 30 and rotatable about a pinion axis perpendicular to and spaced laterally from the rack axis is an interrupted or mutilated pinion 68 having a single cog or tooth 70 which is engageable with the single tooth 62 of the rack, in response to clockwise rotation of the pinion as viewed in FIG. 4 of the drawings, to move the rack 30 inwardly toward the inner end of the housing 20 in opposition to the action of the spring means 50, thereby effecting the working stroke of the rack 30 and of the rivet chuck 36 connected thereto. The single tooth 70 of the pinion 68 is provided with a generally radial bearing face 72 which is engageable with the bearing face 66 of the tooth 72 of the rack 30.

The pinion 68 is rotatable on bearings 74, FIG. 3, carried by a shaft 76 which extends through the housing 20. Coaxial with and rigidly connected to the pinion 68, as by splines 78, is a worm wheel 80 having a worm 82 meshed therewith. The worm 82 is fixed on a worm shaft 84 which is parallel to the rack 30 and rotatable in bearings 86 and 88 carried by the housing 20.

The worm shaft 84 is connected to the drive shaft 24 of the motor 10 by a speed reducing gearing 90 which, in cooperation with the worm 82 and worm wheel 80, provides a very slow rotational speed for the pinion 68 compared to the rotational speed of the drive shaft 24. Considering the gearing 90, the drive gear 26 connected to the drive shaft 24 is meshed with a gear 92 on a shaft 94 which is suitably rotatably mounted in the housing 20 and the bearing plate 22. Coaxial with and rigidly connected to the gear 92 is a gear 96 which is meshed with a gear 98 fixed on the worm shaft 84.

Considering the over-all operation of the riveting machine of the invention, with the rack 30 and the rivet chuck 46 in their outermost positions, the pin of a blind rivet assembly to be set is inserted into the rivet chuck, either before or after the rivet assembly is inserted through the workpieces to be riveted together. Then, the switch 16 is closed to energize the motor 10, whereupon the motor, acting through the drive shaft 24, the gearing 90, the worm 82 and the worm wheel 80, rotates the pinion 68 to bring the tooth 70 thereof into engagement with the tooth 62 of the rack 30, whereupon the pinion moves the rack, and the rivet chuck 46, inwardly in opposition to the action of the spring means 50. When the tooth 70 of the pinion 68 disengages the tooth 62 of the rack 30, the spring means 50 returns the rack and the rivet chuck 46 to their original positions.

It will be understood that if more than one stroke of the rack 30 and the rivet chuck 46 is necessary to set the blind rivet assembly, the machine is permitted to run until the necessary number of strokes has been effected, the rivet chuck advancing along the pin of the rivet assembly as each return stroke is effected by the spring means 50.

It is though that the various advantages of the riveting machine which were discussed previously will be apparent so that a further discussion thereof is not necessary.

Although an exemplary embodiment of the invention has been disclosed herein for purposes of illustration, it will be understood that various minor changes, modifications and substitutions may be incorporated in such embodiment without departing from the spirit of the invention as defined by the claim which follows.

I claim:

In a riveting machine, the combination of:
- (a) a housing having an open outer end;
- (b) a bolt in said housing and aligned with said open outer end of said housing and reciprocable in said housing along the axis of said bolt;
- (c) said bolt having an outer end adjacent said open outer end of said housing;
- (d) the other end of said bolt being entirely within said housing and having an axial bore therein;
- (e) a compression spring within said housing and disposed in said axial bore and seated against said bolt and said housing and biasing said bolt along its axis in a direction to tend to project said outer end of said bolt from said housing through said open outer end thereof;
- (f) said bolt being provided in one side thereof with a notch having a wall perpendicular to said bolt axis and facing said outer end of said bolt;
- (g) axially spaced bearings for said bolt carried by said housing and encircling and engaging said bolt;
- (h) one of said bearings being adjacent said outer end of said bolt and the other encircling the portion of said bolt having said axial bore therein;
- (i) said notch being between said bearings;
- (j) a rotor in said housing adjacent said bolt and rotatable about a rotor axis perpendicular to and spaced laterally from said bolt axis, said bolt being radially opposite said rotor;
- (k) a single, generally radial cog on said rotor and insertable into said notch in said bolt and having a wall engageable with said wall of said notch, in response to rotation of said rotor in a predetermined direction, to displace said bolt along its axis, in opposition to the action of said spring, in a direction to tend to retract said outer end of said bolt into said housing;
- (l) means in said housing for rotating said rotor in said predetermined direction; and
- (m) means on said outer end of said bolt for connecting a rivet chuck thereto.

References Cited in the file of this patent

UNITED STATES PATENTS

| | | |
|---|---|---|
| 1,510,372 | Ambrosio | Sept. 30, 1924 |
| 2,075,162 | Begg | Mar. 30, 1937 |
| 2,122,611 | Kirby | July 5, 1938 |
| 2,643,478 | Paulsen | June 30, 1953 |
| 2,772,858 | Galvez | Dec. 4, 1956 |
| 2,936,626 | Menely et al. | May 7, 1960 |